United States Patent [19]

Yoshii et al.

[11] Patent Number: 5,719,648
[45] Date of Patent: Feb. 17, 1998

[54] LIQUID CRYSTAL DISPLAY APPARATUS AND METHOD FOR PRODUCING THE SAME WITH ELECTRODES FOR PRODUCING A REFERENCE SIGNAL OUTSIDE DISPLAY AREA

[75] Inventors: Shouji Yoshii, Nara; Youichi Hiraishi; Masanobu Ishii, both of Tenri; Yoshinori Shimada, Yamatokoriyama, all of Japan

[73] Assignee: Sharp Kabushiki Kaisha, Osaka, Japan

[21] Appl. No.: 678,956

[22] Filed: Jul. 12, 1996

[30] Foreign Application Priority Data

Jul. 14, 1995 [JP] Japan ................... 7-179271

[51] Int. Cl.⁶ ................ G02F 1/136; G02F 1/1333; G02F 1/1343; G09G 3/36
[52] U.S. Cl. ................ 349/42; 324/770; 345/87; 345/92; 349/54; 349/143; 349/187
[58] Field of Search ................ 349/42, 54, 33, 349/143, 187; 324/770; 345/87, 94, 92

[56] References Cited

U.S. PATENT DOCUMENTS

| | | | |
|---|---|---|---|
| 4,392,718 | 7/1983 | Morrison | 349/33 |
| 4,940,934 | 7/1990 | Kawaguchi et al. | 324/770 |
| 5,285,301 | 2/1994 | Shirahashi et al. | 349/42 |
| 5,465,052 | 11/1995 | Henley | 324/770 |
| 5,504,438 | 4/1996 | Henley | 324/770 |
| 5,598,283 | 1/1997 | Fujii et al. | 349/143 |
| 5,617,230 | 4/1997 | Ohgawara et al. | 349/143 |
| 5,619,358 | 4/1997 | Tanaka et al. | 349/143 |

FOREIGN PATENT DOCUMENTS 1-105219  4/1989  Japan ................. 349/143

OTHER PUBLICATIONS

Ukai et al, "Array Inspection Technique", The Latest Liquid Crystal Processing Technique, 1995, pp. 213–216, 1995.

Primary Examiner—Anita Pellman Gross
Attorney, Agent, or Firm—Nixon & Vanderhye P.C.

[57] ABSTRACT

A liquid crystal display apparatus includes an active matrix substrate and a counter substrate opposing the active matrix substrate via a liquid crystal layer. The active matrix substrate includes: a display portion having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a first electrode provided along the source lines outside of the display portion, wherein the first electrode serves to produce a reference signal by changing a surface potential distribution of the substrate, and the positions of the plurality of pixel electrodes are determined based on the reference signal.

20 Claims, 8 Drawing Sheets

FIG. 2
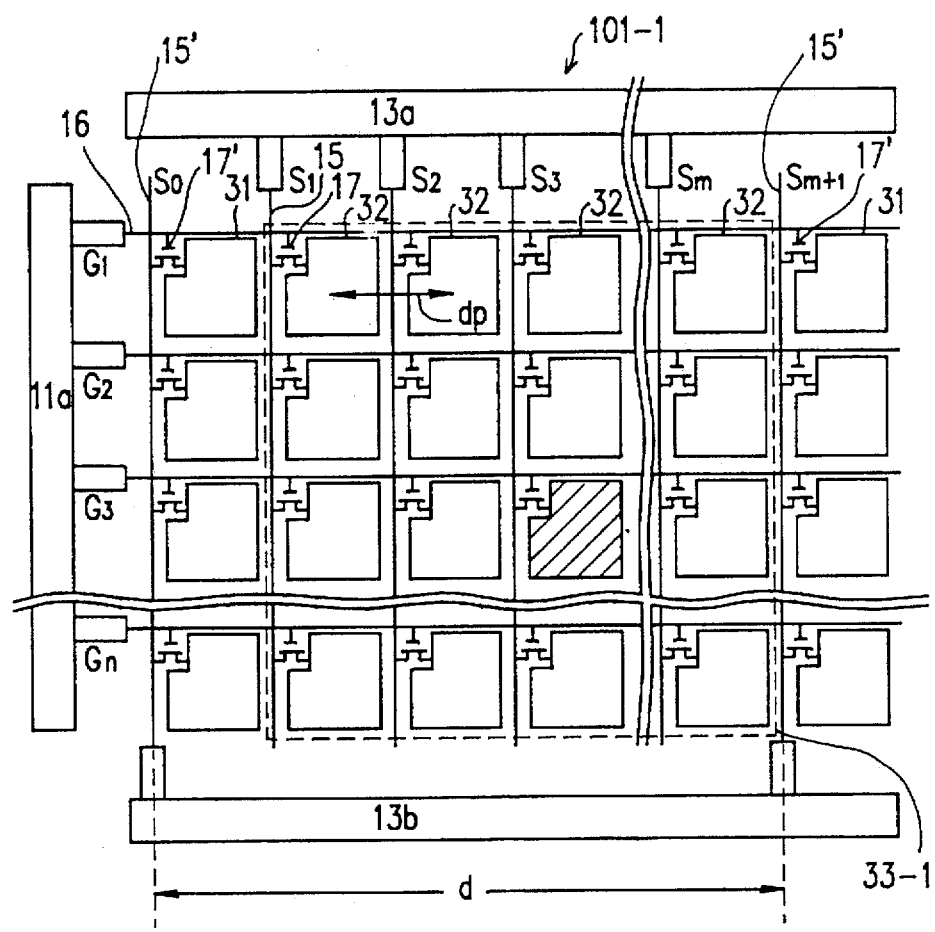
FIG. 3A
FIG. 3B
FIG. 3C
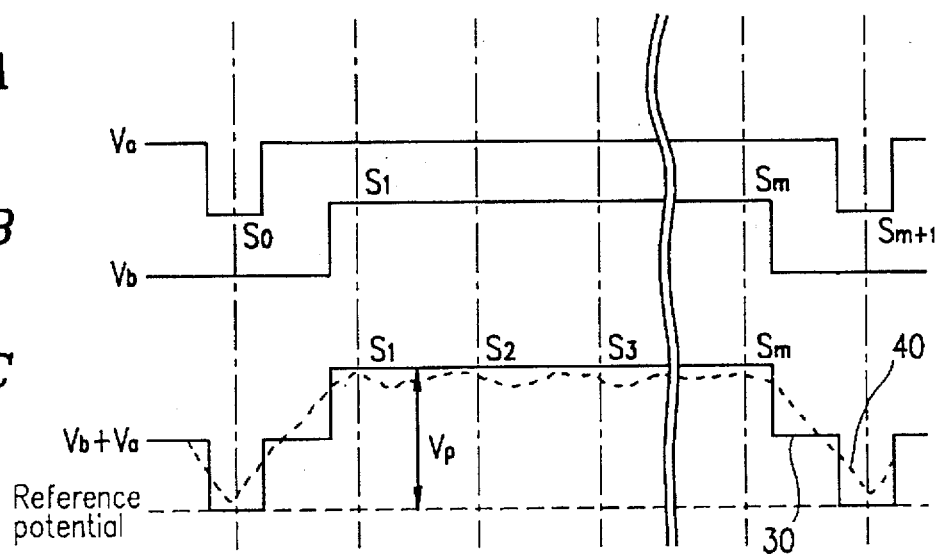

- A pixel electrode of odd column
- A pixel electrode of even column

*FIG.11A* Bright spot
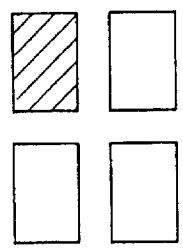
*FIG.11B* Dark spot
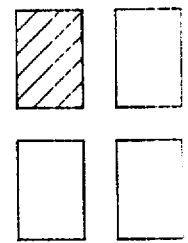
*FIG.11C* Continuous bright spot
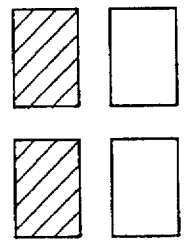
*FIG.11D* Brecks
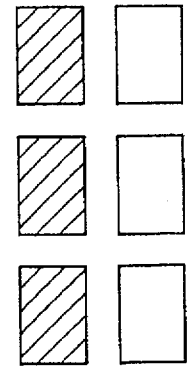

1

LIQUID CRYSTAL DISPLAY APPARATUS AND METHOD FOR PRODUCING THE SAME WITH ELECTRODES FOR PRODUCING A REFERENCE SIGNAL OUTSIDE DISPLAY AREA

BACKGROUND OF THE INVENTION

1. Field of the Invention

The present invention relates to a liquid crystal display apparatus having an active matrix substrate and a method for producing the same.

2. Description of the Related Art

FIG. 5 is a cross-sectional view of an exemplary liquid crystal display apparatus.

Referring to FIG. 5, a counter substrate 3 with a counter electrode 2 is provided so as to oppose a thin film transistor (TFT) display substrate 1. Liquid crystal 4 is sealed between the counter electrode 2 of the counter substrate 3 and the TFT display substrate 1 with a sealant 5. Gate lines and source lines (not shown) are formed in a matrix on the TFT display substrate 1.

FIG. 6 shows a structure of an active matrix large glass substrate 12 on which four TFT display substrates 1 are formed. A TFT display substrate 1 shown in FIG. 5 can be obtained by cutting the glass substrate 21 along dash-dot lines 19.

Referring to FIG. 6, short-circuit lines 11a and 11b are provided in the vicinity of the left and right sides of the glass substrate 12. Short-circuit lines 13a, 13b and 13c are provided in the vicinity of the upper side, the center, and the lower side of the glass substrate 12, respectively. The short-circuit lines 11a, 11b, 13a, 13b and 13c are provided so as to cause a short between the lines to dissipate static charges outside. Thus, switching elements such as TFTs and Metal/Insulator/Metal (MIM) elements, which are subject to static charges, can be protected from static charges.

Two display portions 14-1 and 14-2, each having pixels arranged in a matrix, are provided adjacent to each other between the short-circuit lines 13a and 13b, and two display portions 14-3 and 14-4, each having pixels arranged in a matrix, are provided adjacent to each other between the short-circuit lines 13b and 13c. Source lines 15 are connected to the display portions 14-1 to 14-4 alternately from the upper and lower sides. The source lines 15 are supplied with external display signals. The short-circuit lines 11a and 11b provided in the vicinity of the left and right sides of the glass substrate 12 are connected to the display portions 14-1 to 14-4 through a plurality of gate lines 16. Gate signals are supplied to the display portions 14-1 to 14-4 through the gate lines 16.

FIG. 7 is a partial enlarged diagram showing a structure of the TFT display substrate 1 including the short-circuit lines 11a, 13a and 13b and the display portion 14-1 shown in FIG. 6.

As shown in FIG. 7, a plurality of source lines 15 and a plurality of gate lines 16 are provided so as to cross each other. In the vicinity of each crossing point, a TFT 17 as a switching element is connected to the source line 15 and the gate line 16. Pixel electrodes 18 connected to the TFTs 17 are provided in a matrix in regions surrounded by the source lines 15 and the gate lines 16.

Hereinafter, a method for producing a liquid crystal display apparatus having the above-mentioned active matrix large glass substrate 12 and a method for detecting defective pixels and breaks in the glass substrate 12 will be described.

In the TFT production step of forming the TFTs 17 and the pixel electrodes 18, a plurality of TFT display substrates 1 are simultaneously formed on the glass substrate 12 as shown in FIG. 6. Thereafter, the glass substrate 12 is attached to a counter substrate 3, and liquid crystal 4 is injected therebetween. The glass substrate 12 is cut into four portions along dash-dot lines 19 in FIG. 6. The short-circuit lines 11a, 11b, 13a, 13b and 13c are cut away by trimming the edges of the glass substrate 12, whereby a plurality of gate lines 16 are insulated from each other. Although the short-circuit lines 11a, 11b, 13a, 13b and 13c are shown in large line-width for convenient observation, they actually have a line-width of about 400 μm to 1000 μm. Furthermore, a mounting step of attaching external drive components such as a TAB is conducted. In this way, an active matrix liquid crystal display apparatus is completed.

Defective components should be removed in each production step. Since more expensive components are used in later steps, defective components should be detected by inspection in earlier stages so as not to pass the defective components to the later steps. As the initial inspection, an electrooptical inspection for detecting defective pixels and breaks is conducted with respect to the glass substrate 12 shown in FIG. 6 at the end of the TFT production step.

The above-mentioned inspection method will be exemplified with reference to FIGS. 8A to 8D, 9A and 9B.

First, a signal shown in FIG. 8A is input to the source lines 15 ($S_1, S_3, \ldots, S_{m-1}$; odd lines) through the short-circuit line 13a. Then, an inspection is conducted by using an inspection apparatus shown in FIG. 9A. Signals shown in FIGS. 8A to 8D correspond to the positions of the pixel electrodes 18 shown in FIG. 7.

More specifically, a signal of + volts or − volts is input through the short-circuit line 13a, thereby charging the pixel electrodes 18 of the odd columns. Under this state, as shown in FIG. 9A, a light beam 22 represented by solid arrows is radiated from a lamp 21 to an optical modulation element 24 (Pockels element) through a half mirror 23. The optical modulation element 24 is made of a special crystal plate of which the refractive index varies depending upon the intensity of the electric field in a place where the optical modulation element 24 is placed. Therefore, the polarization state of reflected light 22' (represented by dotted arrows) radiated to the glass substrate 12 varies depending upon the surface potential of the pixel electrodes 18. The reflected light 22' from a non-conductive organic reflective film 24a under the optical modulation element 24 passes through the optical modulation element 24, the half mirror 23, and a λ/4 plate 25. The reflected light 22', from which components having a different phase has been removed by the λ/4 plate 25, is imaged by an imaging device such as a CCD 26. The imaging signal thus obtained is used as a surface potential of the pixel electrodes 18. The resultant imaging signal is subjected to image processing and stored in a memory.

Then, the signal shown in FIG. 8A is turned off, and the signal shown in FIG. 8B is input to the source lines 15 ($S_2, S_4, \ldots, S_m$; even lines) through the short-circuit line 13b. In this case, image processing is also conducted. Thereafter, the sum of the signal voltages of FIGS. 8A and 8B is taken to obtain a signal represented by a solid line of FIG. 8C. The ability of an imaging device such as the CCD 26 to obtain a dynamic range (electric potential of pixels) is not so satisfactory as that of an electric method using a probe pin. Therefore, the sum of the signal voltages shown in FIG. 8A and the signal voltages shown in FIG. 8B is taken so that the imaging device can obtain a sufficient dynamic range, whereby defective components are detected easily. As shown in FIG. 8C, an output waveform 20 represented by a dotted line is obtained as a signal after imaging with respect to an input signal represented by a solid line. For example, even when a voltage of 20 volts is input as an input signal, an actually obtained output signal is about 12 to 18 volts.

A method for obtaining the output waveform 20 will be described below. As shown in FIG. 9B, four imaging pixels 27 of the CCD 26 represented by a dotted line are used for one pixel electrode 18. The electric potential of the respective pixel electrodes 18 measured by the imaging pixels 27 of the CCD 26 are averaged and differentiated, and the value thus obtained is used as an electric potential of the center of gravity A of the pixel electrode 18 represented by a dash-dot line. The output waveform 20 is obtained by connecting the electric potentials of the centers of gravity A of the pixel electrodes 18.

Alternatively, the TFT display substrate 1 is divided into 48 (8×6) portions as shown in FIG. 10, and the above-mentioned measurement is repeated in the direction represented by an arrow by using the inspection apparatus shown in FIG. 9A.

FIGS. 11A to 11D show representative defects such as defective pixels and breaks detected by the above-mentioned electrooptical inspection. Pixels corresponding to shaded portions are defective pixels. FIG. 11A shows bright spot defects. In this case, a signal is not input to a pixel electrode due to its broken TFT. More specifically, the electric potential of the pixel electrode with a broken TFT is 0 volt. FIG. 11B shows dark spot defects. In this case, a signal is always input to a pixel electrode due to leakage caused by its broken TFT. Even when a gate signal is turned off, a source is maintained supplied with a voltage. FIG. 11C shows continuous bright spot defects. In this case, bright spots are connected, remarkably decreasing display quality. FIG. 11D shows breaks in which lines are cut at some midpoint thereof—the breaks can be repaired. Regarding the above-mentioned defects of bright spots and dark spots, the cases of a normally white mode are now described.

The above-mentioned conventional inspection method does not have substantial problems in obtaining a dynamic range in the case where the input terminals of the source lines 15 as shown in FIG. 6 are provided on the upper and lower sides of the display portions (14-1 to 14-4) (external double input terminals).

In recent years, external single input terminals have become popular, i.e., the input terminals of the source lines are provided only on one side of the display portions. The external single input terminals enable the frame of the display portion to be reduced because of the great decrease in the number of driver ICs such as a TAB (e.g., the frame of the display portion is reduced in note-type PCs). In other words, this realizes a larger display portion with the same substrate area.

However, in the case of the external single input terminals, the sum of signal voltages cannot be taken, and thus, it is not possible to detect defects by the conventional inspection methods. More specifically, in the case of the external single input terminals, a signal as represented by a solid line of FIG. 8D is input to all the pixel electrodes, and an output waveform 20' represented by a dotted line is obtained as an output signal after imaging.

As is apparent from FIG. 8D, the first pixel and the last pixel cannot be located. In addition, the adjacent pixels cannot be discriminated from each other due to the low resolution of an imaging device such as the CCD 26.

Furthermore, as is apparent from FIG. 9B, the pixel electrodes 18 are arranged at a different pitch from that of the imaging pixels 27 of the CCD 26. Therefore, one imaging pixel 27 overlaps with the adjacent pixel electrodes 18. This makes it very difficult to discriminate pixels from each other.

For the reasons described above, defects cannot be detected on a pixel basis. This causes a serious problem. That is, if connected bright spot defects cannot be detected, a display quality substantially decreases. This problem becomes more remarkable with the increase in resolution of a panel, because a pitch of the pixel electrodes 18 becomes smaller.

Regarding the difficulty in discriminating the pixel electrodes, the resolution of the CCD 26 can be increased. However, this causes problems such as a long inspection time and expensive inspection apparatus. Furthermore, in order to overcome this difficulty, the pitch of the pixel electrodes 18 is aligned with that of the imaging pixels 27. However, this requires one inspection apparatus for one kind of liquid crystal display apparatus. Such a countermeasure is possible when a few kinds of apparatus are produced; however, it is not suitable for producing a number of kinds of apparatus.

Furthermore, an electric potential $V_p'$ from the reference potential in the signal shown in FIG. 8D is half of an electric potential $V_p$ from the reference potential in the signal shown in FIG. 8C. This is a critical problem. One pixel electrode 18 is imaged by a plurality of imaging pixels of the CCD 26, so that there is no problem if the center of a plurality of imaging pixels matches with the center of gravity of the pixel electrode 18. However, actually, the imaging pixels 27 of the CCD 26 have a different size from that of the pixel electrodes 18 and an alignment shift during the photolithography step is caused in the course of TFT display substrate production. Thus, the center of a plurality of imaging pixels does not match with the center of gravity of the pixel electrode 18. This makes it difficult to obtain a sufficient dynamic range, leading to difficulty in detecting defective pixels. Because of this, the defects, which can be corrected during the production of an active matrix substrate, cannot be corrected after the injection of a liquid crystal material 4, resulting in the decrease in a ratio of satisfactory products.

SUMMARY OF THE INVENTION

A liquid crystal display apparatus of the present invention includes an active matrix substrate and a counter substrate opposing the active matrix substrate via a liquid crystal layer, the active matrix substrate including: a display portion having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a first electrode provided along the source lines outside of the display portion, wherein the first electrode serves to produce a reference signal by changing a surface potential distribution of the substrate, and the positions of the plurality of pixel electrodes are determined based on the reference signal.

In one embodiment of the present invention, the first electrode is a dummy electrode which is not used for display.

In another embodiment of the present invention, the first electrode is composed of a plurality of electrodes having the same structure as a structure of the pixel electrodes.

In another embodiment of the present invention, external single input terminals of the source lines are provided only on one side of the display portion.

In another embodiment of the present invention, external single input terminals of the source lines and external single input terminals of the first electrode are provided on different sides of the display portion.

In another embodiment of the present invention, at least two of the first electrodes are provided along the source lines on both sides of the display portion.

In another embodiment of the present invention, the first electrode has a strip-shape.

According to another aspect of the present invention, a method for producing a liquid crystal display apparatus is provided. The apparatus includes: an active matrix substrate having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a counter substrate opposing the active matrix substrate via a liquid crystal layer. The method includes the steps of: forming a first electrode along the source lines outside the display portion; applying a voltage to an element connected to the first electrode produces a first surface potential distribution of the substrate; detecting the first surface potential distribution, thereby determining the position of the first electrode; and determining positions of the plurality of pixel electrodes based on the position of the first electrode.

In one embodiment of the present invention, the above-mentioned method further includes the steps of: applying a voltage to the plurality of pixel electrodes through the plurality of source lines to produce a second surface potential distribution of the substrate after the step of determining positions of the plurality of pixel electrodes; detecting the second surface potential distribution of the substrate; sampling a sum potential distribution of the first surface potential distribution and the second surface potential distribution; and determining the position of a defective pixel based on a sample from the sampling of the sum potential distribution.

In another embodiment of the present invention, the first electrode is a dummy electrode which is not used for display.

In another embodiment of the present invention, the first electrode is formed in the same step as a step of forming the pixel electrodes so as to have the same structure as a structure of the pixel electrodes.

In another embodiment of the present invention, the first electrode is formed so as to have a strip-shape.

In another embodiment of the present invention, the strip-shaped first electrode functions so as to protect the switching elements from static charges generated in the course of production.

In another embodiment of the present invention, external single input terminals of the source lines are provided only on one side of the display portion.

In another embodiment of the present invention, external single input terminals of the source lines and external single input terminals of the first electrode are provided on different sides of the display portion.

In another embodiment of the present invention, at least two of the first electrodes are provided along the source lines on both sides of the display portion.

An active matrix substrate of the present invention includes: a display portion having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a first electrode provided along the source lines outside of the display portion, wherein the first electrode serves to produce a reference signal by changing a surface potential distribution of the substrate, and the positions of the plurality of pixel electrodes are determined based on the reference signal.

In one embodiment of the present invention, the first electrode is in the form of a strip.

According to another aspect of the present invention, a method for inspecting an active matrix substrate is provided. The substrate includes: a display portion having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a first electrode provided along the source lines outside of the display portion. The method includes the steps of: applying a voltage to an element connected to the first electrode produces a first surface potential distribution of the substrate; detecting the first surface potential distribution, thereby determining the position of the first electrode; and determining positions of the plurality of pixel electrodes based on the position of the first electrode.

In one embodiment of the present invention, the above-mentioned method further includes the steps of: applying a voltage to the plurality of pixel electrodes through the plurality of source lines to produce a second surface potential distribution of the substrate after the step of determining positions of the plurality of pixel electrodes; detecting the second surface potential distribution of the substrate; sampling a sum potential distribution of the first surface potential distribution and the second surface potential distribution; and determining the position of a defective pixel based on a sample from the sampling of the sum potential distribution.

Thus, the invention described herein makes possible the advantages of: (1) providing a liquid crystal display apparatus capable of easily, accurately, and efficiently inspecting panels having external single input terminals currently in popular use without greatly changing the currently used inspectors; and (2) providing a method for producing the same.

These and other advantages of the present invention will become apparent to those skilled in the art upon reading and understanding the following detailed description with reference to the accompanying figures.

BRIEF DESCRIPTION OF THE DRAWINGS

FIG. 2 illustrates a partial enlarged display portion including short-circuit lines in Example 1.

FIGS. 3A through 3C show waveforms of inspection signals supplied to dummy pixel electrodes or display pixel electrodes in FIG. 2.

FIGS. 11A, 11B, 11C and 11D respectively illustrate representative defective states, such as defective pixels and breaks, found by electrooptical inspection.

DESCRIPTION OF THE PREFERRED EMBODIMENTS

Hereinafter, the present invention will be described by way of illustrative examples with reference to the drawings.

EXAMPLE 1

Figure 1:
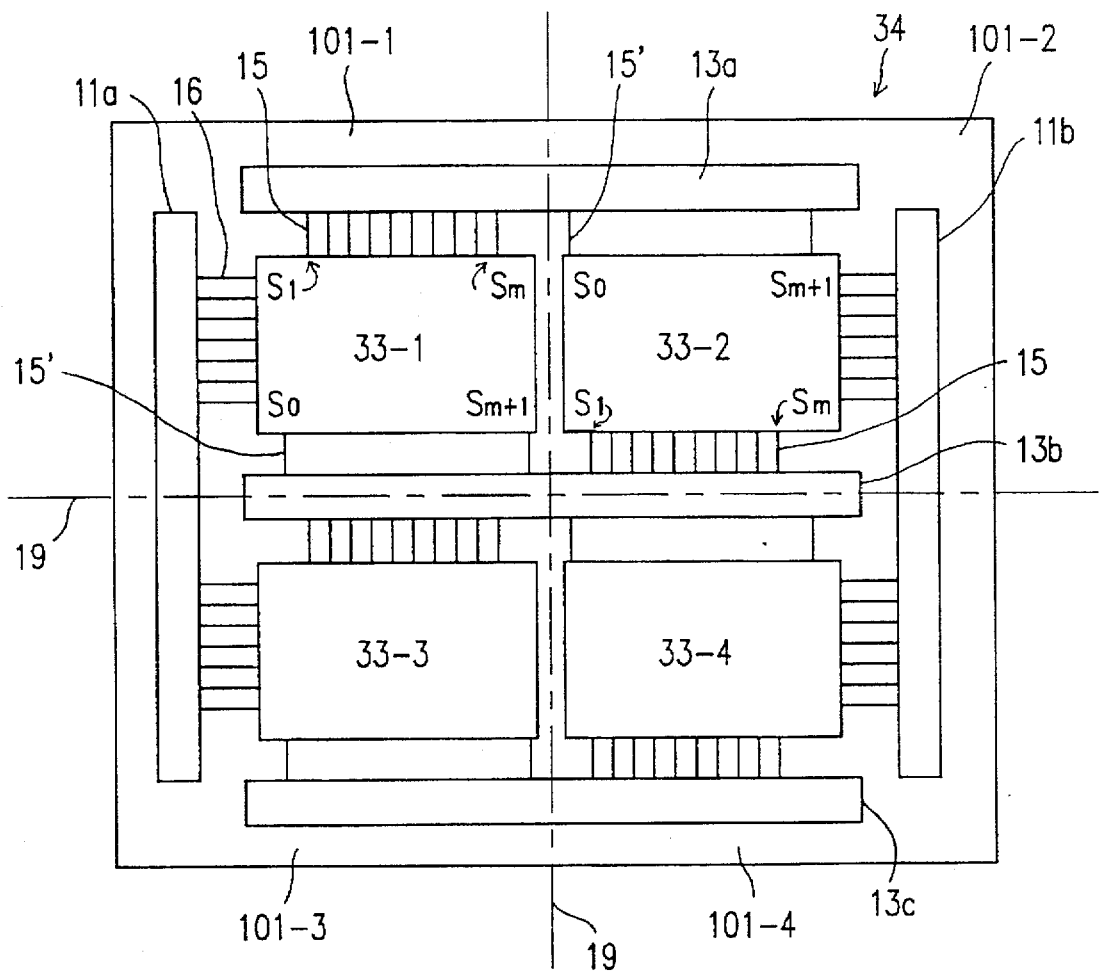
FIG. 1 is a view illustrating a configuration of a large glass substrate including four TFT display substrates in Example 1.

FIG. 1 shows a configuration of an active matrix large glass substrate 34 in Example 1 according to the present invention. The glass substrate 34 includes four TFT display substrates 101-1 to 101-4. The TFT display substrates 101-1 to 101-4 have display portions 33-1 to 33-4, respectively. FIG. 2 shows the partial enlarged TFT display substrate 101-1 including short-circuit lines 11a, 13a and 13b, and the display portion 33-1. The elements having the same function and effect as those of the conventional example carry identical reference numerals, and their descriptions are omitted.

As shown in FIG. 2, a plurality of dummy pixel electrodes 31 are provided along source lines 15 on the right and left sides out of the display portion 33-1. The dummy pixel electrodes 31 are connected to gate lines 16 and short-circuit line 13b through lines 15'. The dummy pixel electrodes 31 are formed independently (i.e., electrically isolated) from the source lines 15 connected to the display pixel electrodes 32, and thus, they can be supplied with a voltage through the short-circuit line 13b independently from the source lines 15 connected to the short-circuit line 13a. The dummy pixel electrodes 31 are not used for display but function as electrodes (hereinafter, referred to as locating pixel electrodes) for locating pixels. The dummy pixel electrodes 31 serve to produce a reference signal by changing a surface potential distribution of the substrate 34, and the positions of the plurality of pixel electrodes 32 are determined based on the reference signal.

Display pixel electrodes 32 are provided in a matrix between two columns of the dummy pixel electrodes 31. The dummy pixel electrodes 31 and the display pixel electrodes 32 are connected to the lines 15' and the source lines 15 and the gate lines 16 through TFTs 17', 17, respectively. The dummy pixel electrodes 31, lines 15' and TFTs 17' can be formed in the same step of forming the display pixel electrodes 32, source line 15 and TFTs 17 by a conventional method so that they have the same structures, respectively. In the case of a VGA with a diagonal line of 25 cm, the pixel electrodes 32 and the dummy pixel electrodes 31 have, for example, a width of 86 μm and a length of 284 μm.

As described above in the present example, the TFTs 17' and the dummy pixel electrodes 31 which are not used for display are provided on the right and left sides of the TFT display substrate 101-1. The TFTs 17' and the dummy pixel electrodes 31 which are not used for display constitute dummy patterns.

As shown in FIG. 2, each input terminal of the source lines 15 connected to the display pixel electrodes 32 are provided only on the upper side of the display portion 33-1. More specifically, an external display signal is input to the display pixel electrodes 32 in columns $S_1$ to $S_m$ through each input terminal of the source lines 15 in one direction (external single input terminals).

Figure 6:
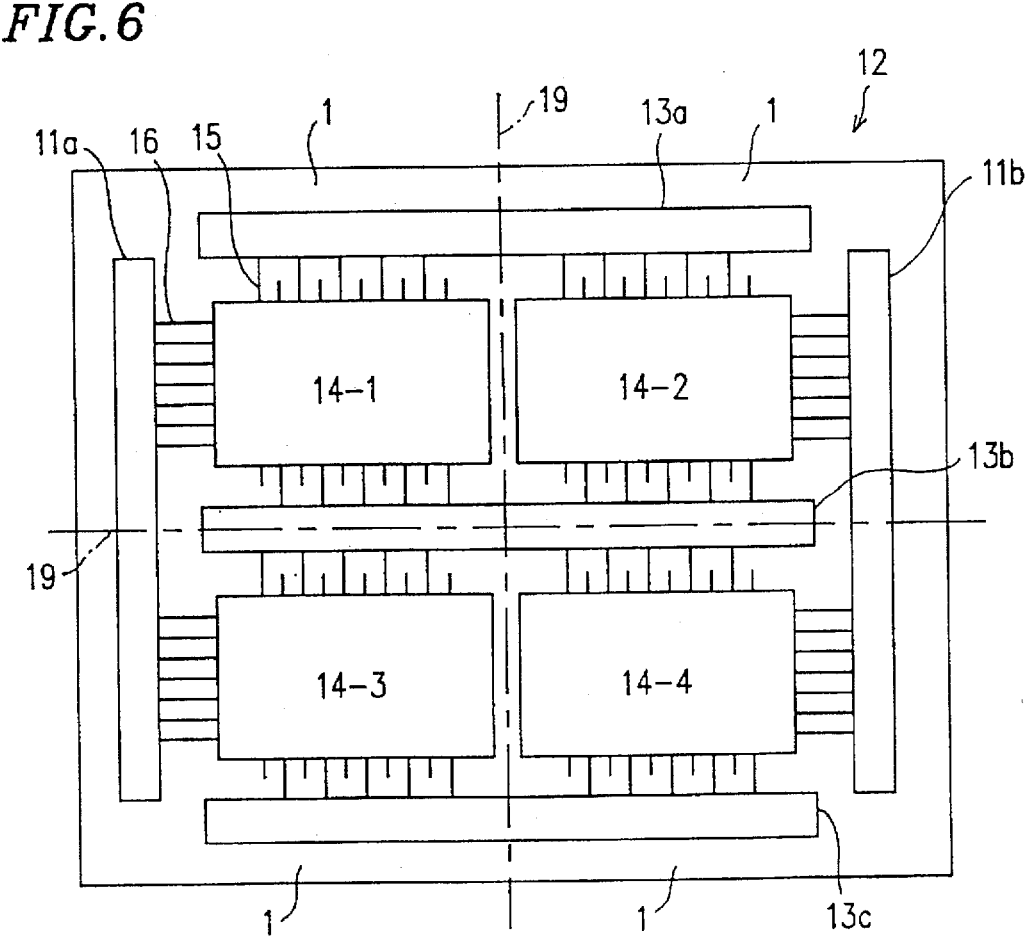
FIG. 6 is a view illustrating a configuration of a conventional large glass substrate including four TFT display substrates.
Figure 7:
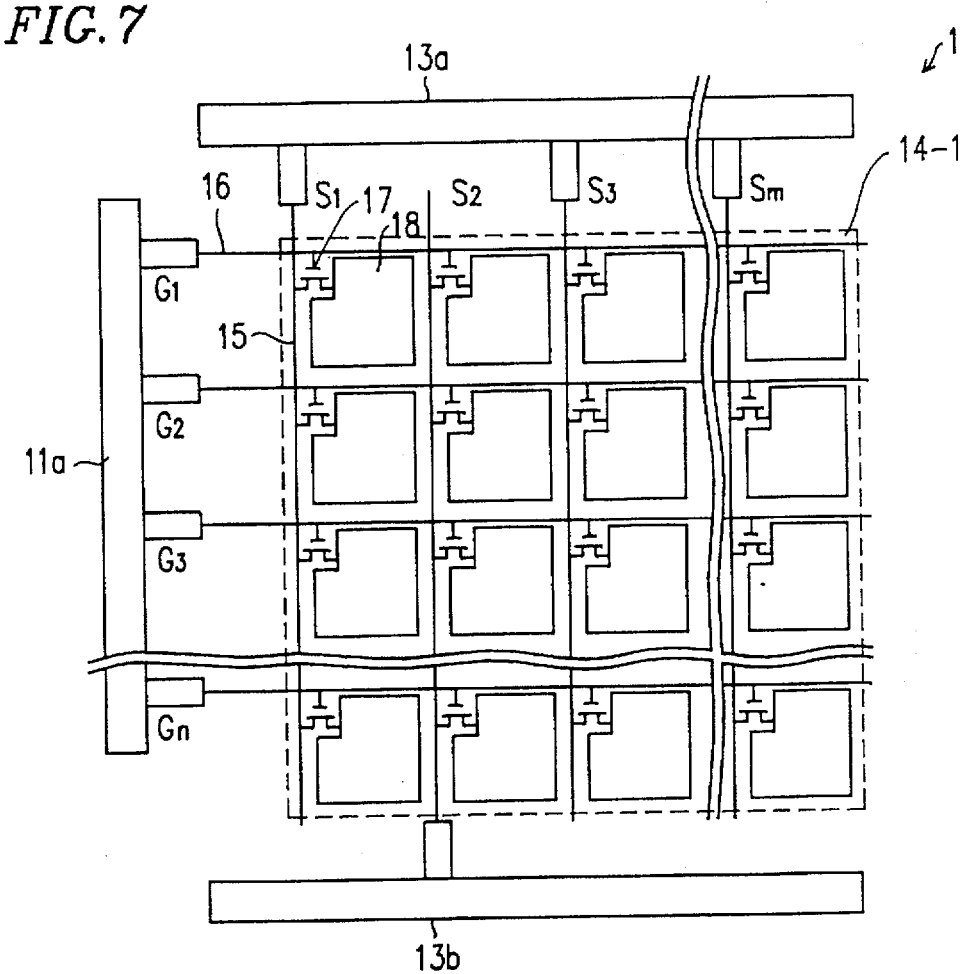
FIG. 7 illustrates a partial enlarged display portion including short-circuit lines of the conventional large glass substrate.
Figure 8A:
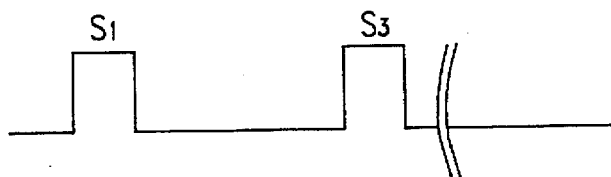
FIGS. 8A, 8B, 8C and 8D show waveforms of conventional inspection signals supplied to each source line in FIG. 7.
Figure 8B:
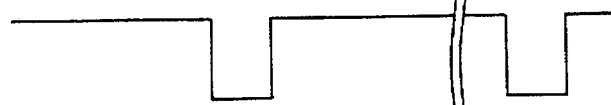
Figure 8C:
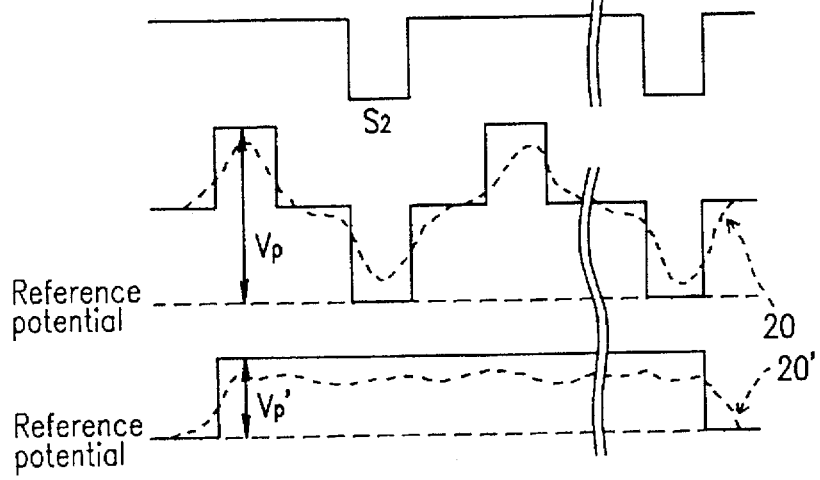
Figure 8D:
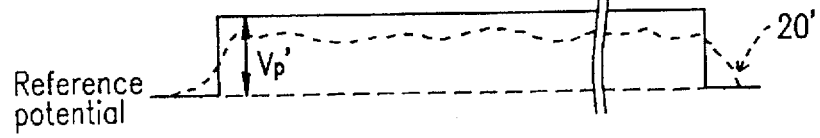

The glass substrate 34 of the present example is different from the conventional ones shown in FIGS. 6 and 7 in that the dummy patterns are provided on the right and left sides of the display portions 33-1 to 33-4 and the input terminal is provided only on one end of the respective source lines 15.

The dummy pixel electrodes 31 and the display pixel electrodes 32 are connected to the short-circuit lines 13a, 13b or 13c on the basis of the display portions 33-1 to 33-4. More specifically, the dummy pixel electrodes 31 in the first column $S_0$ and the last column $S_{m+1}$ of the upper left display portion 33-1 (FIGS. 1 and 2) are supplied with a signal through the short-circuit line 13b. The display pixel electrodes 32 in the columns $S_1$ to $S_m$ between the dummy pixel electrodes 31 in the columns $S_0$ and $S_{m+1}$ are supplied with a signal through the short-circuit line 13a.

In the case of the display portion 33-2 (FIG. 1), the dummy pixel electrodes 31 (not shown) in the first column $S_0$ and the last column $S_{m+1}$ are supplied with a signal through lines 15' connected to the short-circuit line 13a. The display pixel electrodes 32 (not shown) in the columns $S_1$ to $S_m$ between the dummy pixel electrodes 31 in the columns $S_0$ and $S_{m+1}$ are supplied with a signal through the source lines 15 connected to the short-circuit line 13b. As is understood from FIG. 1, in the display portions 33-3 and 33-4, the dummy pixel electrodes 31 and the display pixel electrodes 32 (not shown) are also connected to the short-circuit lines 13b or 13c through the source lines 15 and lines 15' in the similar manner to that of the display portions 33-1 and 33-2. Accordingly, the glass substrate 34 of the present example is constructed.

Referring to FIGS. 2, and 3A through 3C, a method for electrooptically detecting defective pixels, breaks, and the like in the glass substrate 34 having the above-mentioned structure will be described. The signals in FIGS. 3A through 3C correspond to the positions of the pixel electrodes 31 and 32 in FIG. 2.

First, a signal $V_a$ shown in FIG. 3A is input to the lines 15' connected to the dummy pixel electrodes 31 in the first column $S_0$ and the last column $S_{m+1}$ through the short-circuit line 13b. Then, electrooptical inspection is conducted in the same way as described above, for example, using an inspection apparatus shown in FIG. 9A. Positions of the dummy pixel electrodes 31 are determined by detecting the surface potential of the dummy pixel electrodes 31 as a function of positions in the TFT display substrate 101-1. Positions of the plurality of pixel electrodes 32 are determined based on the positions of the dummy pixel electrodes 31. This inspection will be described in more detail below.

Figure 9A:
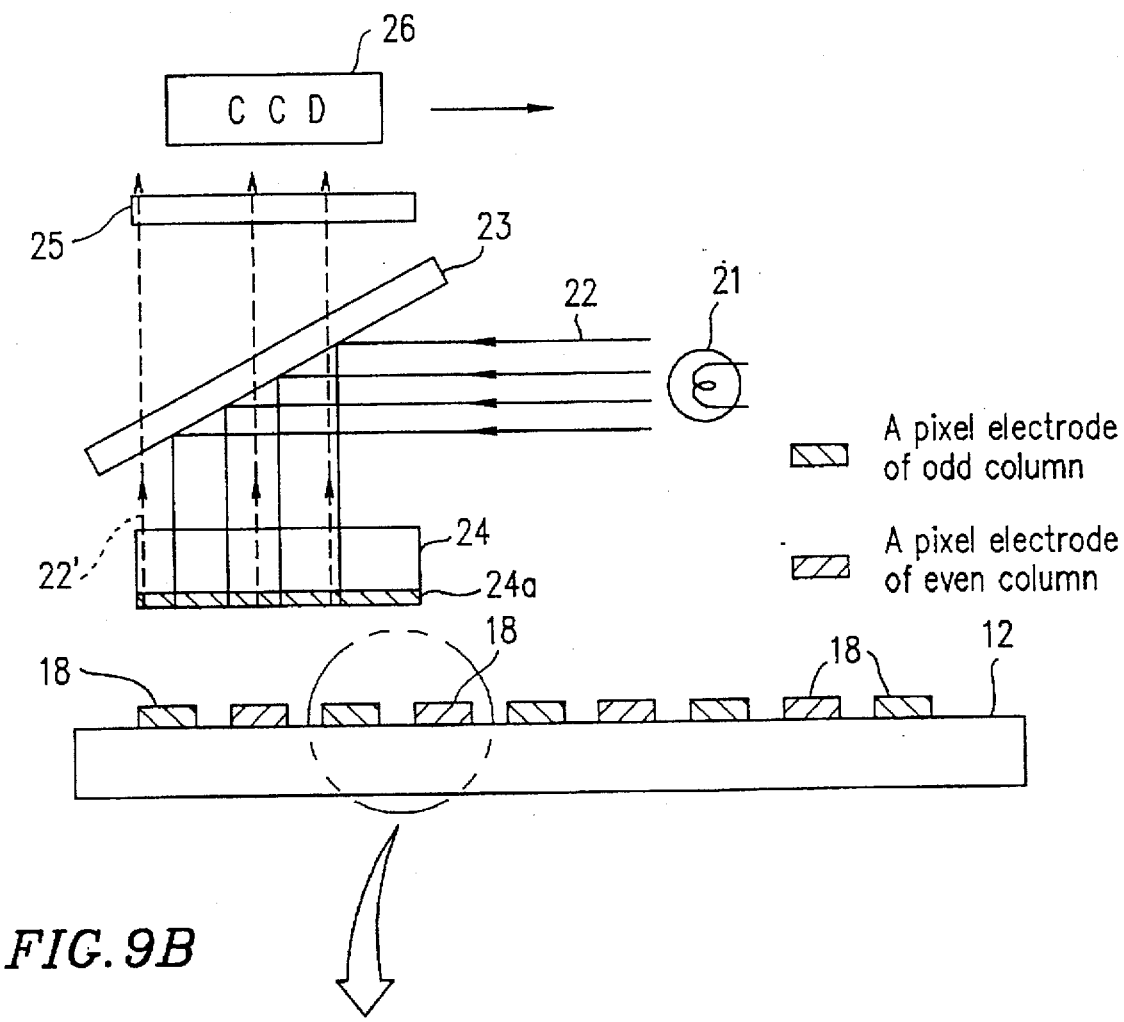
FIG. 9A is a cross-sectional view of a inspection apparatus for an active matrix substrate.
Figure 9B:
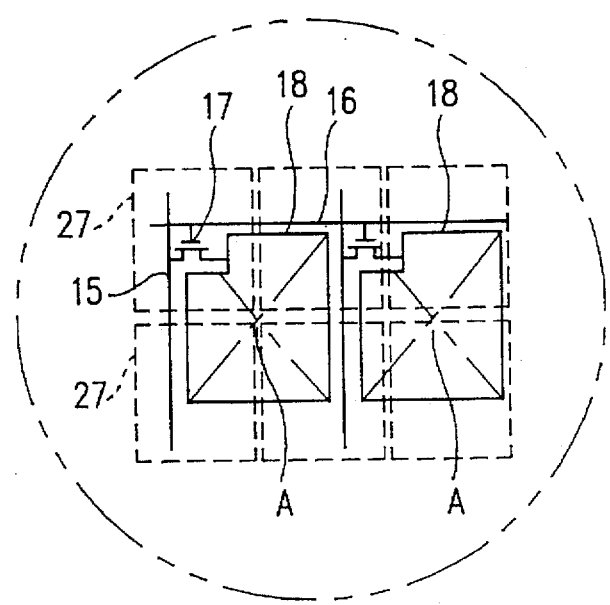
FIG. 9B is an enlarged plan view of pixel portions of the active matrix substrate.
Figure 10:
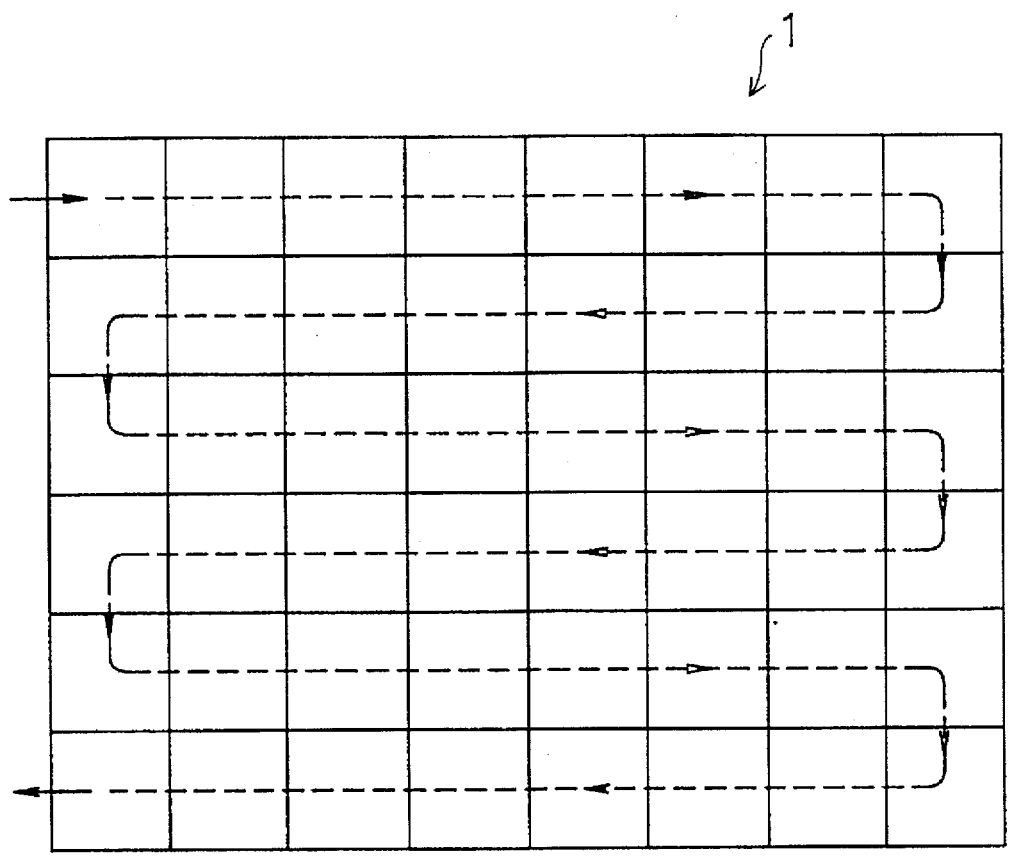
FIG. 10 illustrates an example of a inspection method using the inspection apparatus of FIG. 9A.

A signal $V_a$ shown in FIG. 3A is input through the short-circuit line 13b, thereby charging the dummy pixel electrodes 31. Under this state, as shown in FIG. 9A, a light beam 22 represented by solid arrows is radiated to an optical modulation element 24 through a half mirror 23. The polarization state of reflected light radiated to the glass substrate 34 varies depending upon the surface potential of the dummy pixel electrodes 31. The reflected light from a non-conductive organic reflective film 24a under the optical modulation element 24 passes through the optical modulation element 24, the half mirror 23, and a λ/4 plate 25. The reflected light, from which components having a different phase has been removed by the λ/4 plate 25, is imaged by an imaging device such as a CCD 26. The imaging signal thus obtained is used as a surface potential of the dummy pixel electrodes 31.

The dummy pixel electrodes 31 in the column $S_0$ are located based on the surface potential of the dummy pixel electrodes 31 thus obtained. The surface potential of the dummy pixel electrodes 31 has reference signals corresponding to the $S_0$ and $S_{m+1}$ shown in FIG. 3A. In addition, a distance d (actually measured value d) of the pixel electrodes from the column $S_0$ to the column $S_{m+1}$ is obtained based on the surface potential of the dummy pixel electrodes 31. The distance d is compared with a distance D (previously designed value D) of the pixel electrodes from the column $S_0$ to the column $S_{m+1}$. The comparison between the actually measured value d and the previously designed value D makes it possible to find how much positional shift of the pixel electrodes occurs. The actually measured value d is divided by $S_{m+2}$ (the number of the source lines 15), whereby a distance between the centers of gravity of adjacent pixel electrodes is obtained.

The distance dp is also obtained by providing the dummy pattern on one side of the respective display portions 33-1 to 33-4 and simultaneously applying signals to the dummy pattern and the pixel electrodes. However, the distance dp is more accurately obtained when the dummy patterns are provided on the right and left sides of the display portions 33-1 to 33-4. For this reason, the dummy patterns are provided on the right and left sides in the present example.

Hereinafter, the measurement of the distance dp between the centers of gravity of the pixel electrodes will be described. The case of using a VGA (640×3-colors×480) panel with a diagonal line of 25 cm (about 10 inches) will be exemplified. First, the signal $V_a$ shown in FIG. 3A is input through the short-circuit line 13b. Then, the distance d (actually measured value d) of the pixel electrodes from the column $S_0$ to the column $S_{m+1}$ is obtained by image processing. The actually measured value d is 200.210 mm. The distance D (previously designed value D) of the pixel electrodes from the column $S_0$ to the column $S_{m+1}$ is 200.208 mm. When the actually measured value d is compared with the previously designed value D, it is understood that there is only a slight difference therebetween. Such a difference is negligible when converted so as to correspond to one pixel. Considering the measurement error, the previously designed value D is used as the actually measured value d. The distance dp between the centers of gravity of the pixel electrodes is represented by dp=d/$S_{m+2}$, where m is 1920. Thus, dp is 104 μm.

In other words, a voltage is applied to the dummy pixel electrodes 31, to produce a surface potential distribution of the glass substrate 34. Then, the surface potential distribution is detected, thereby determining the positions of the dummy pixel electrodes 31. Positions of the plurality of pixel electrodes 32 are determined based on the positions of the dummy pixel electrodes 31.

In general, the width of source lines (e.g., 5 to 6 μm) is smaller than that of gate lines (e.g., 10 μm). Therefore, the distance between the pixel electrodes in the horizontal direction is smaller than that in the vertical direction. Thus, it is not required to determine the position of the pixel electrodes in the column direction.

Next, the signal $V_a$ shown in FIG. 3A is turned off, and a signal $V_b$ having a reverse polarity of the signal $V_a$ shown in FIG. 3B is input through the short-circuit line 13a. Then, image processing is conducted by using an imaging device such as a CCD, and the result is stored. That is, the surface potential of a plurality of pixel electrodes 32 are detected as a function of the positions of the glass substrate 34. The sum ($V_b+V_a$) of the signal $V_b$ shown in FIG. 3B and the signal $V_a$ shown in FIG. 3A is obtained as a signal 30 shown in FIG. 3C. A broken line 40 represents an actually obtained output signal after imaging. The electric potential at the center of gravity in each pixel electrode is sampled, based on the distance dp obtained as described above. This minimizes the influence of peripheral pixels, and thus, the exact value of the electric potential of the center of gravity of each pixel electrode can be obtained efficiently. Furthermore, assuming that a peak value $V_0$ of the signal $V_a$ shown in FIG. 3A' is a reference potential, a sufficiently large electric potential $V_p$ is obtained as is apparent from FIG. 3C.

As described above, the signal $V_a$ shown in FIG. 3A is input through the short-circuit line 13b to obtain a first surface potential distribution. Then, the signal $V_b$ shown in FIG. 3B is input through the short-circuit line 13a to obtain a second surface potential distribution. The signal 30 shown in FIG. 3C is obtained as a sum potential distribution from the sum potential of the first surface potential distribution and the second surface potential distribution. The sum potential of the center of gravity in each pixel electrode can be sampled, based on the calculated distance dp between the adjacent pixel electrodes.

Herein, the sum potential of the pixel electrodes is obtained under the condition that the electric potential $V_p$ is 20 volts. In the case of normal pixels, a sum potential of about 12 to 18 volts can be obtained. For example, a sample from the sampling of the sum potential distribution of only 10 volts is obtained with respect to a pixel electrode represented by a shaded portion of FIG. 2. Comparing the obtained value of 10 volts with the value of about 12 to 18 volts, this pixel is determined to be defective.

It is very difficult to produce all the pixels satisfactorily. Therefore, a TFT display substrate 101 with a few defective pixels is determined to be satisfactory. In the case of the panel shown in FIG. 2, all the pixels except for one (represented by the shaded portion) is satisfactory. A TFT of the defective pixel is repaired, and the panel is transferred to the subsequent liquid crystal injection step. Defective pixels can be detected faster by using two or more CCDs.

A method for producing a liquid crystal display apparatus having the TFT display substrate 101-1 in the present example will be described below.

In the TFT production step of forming the TFTs 17 and the pixel electrodes 32, the TFT display substrates 101-1 to 101-4 are simultaneously formed on the glass substrate 34 as shown in FIG. 1 by a known method. The dummy pixel electrodes 31, line 15' and TFTs 17' are formed in the same step of forming the display pixel electrodes 32, source line 15 and TFTs 17 so that they have the same structures, respectively.

Thereafter, the glass substrate 34 is attached to a counter substrate, and liquid crystal is injected therebetween. The glass substrate 34 is cut into four portions along a dash-dot line 19 in FIG. 1. The short-circuit lines 11a, 11b, 13a, 13b and 13c are cut away by trimming the edges of the glass substrate 34, whereby a plurality of gate lines 16 are insulated from each other. Although the short-circuit lines 11a, 11b, 13a, 13b and 13c are shown in large line-width for convenient observation, they actually have a line-width of about 400 μm to 1000 μm. Furthermore, a mounting step of attaching external drive components such as a TAB is conducted. In this way, an active matrix liquid crystal display apparatus is completed.

EXAMPLE 2

Figure 4:
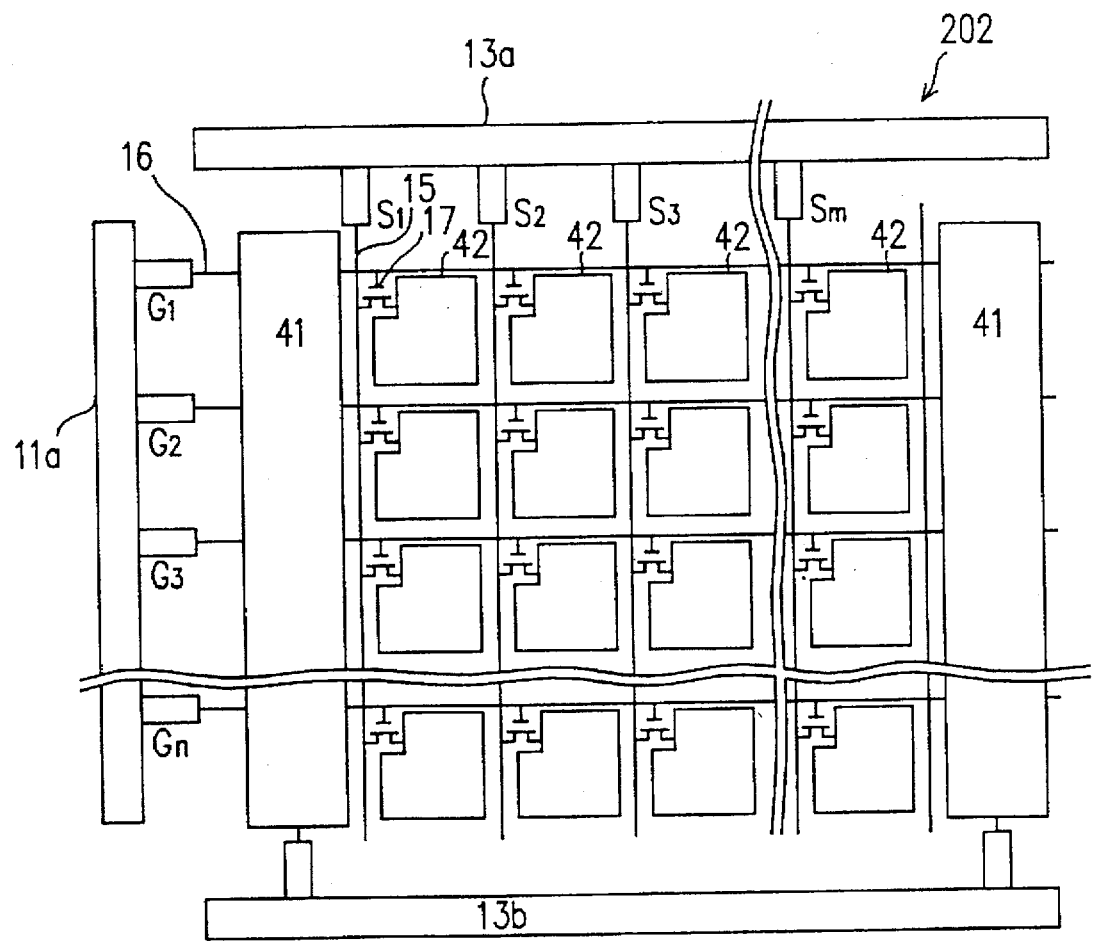
FIG. 4 illustrates a partial enlarged display portion including short-circuit lines in Example 2.
Figure 5:
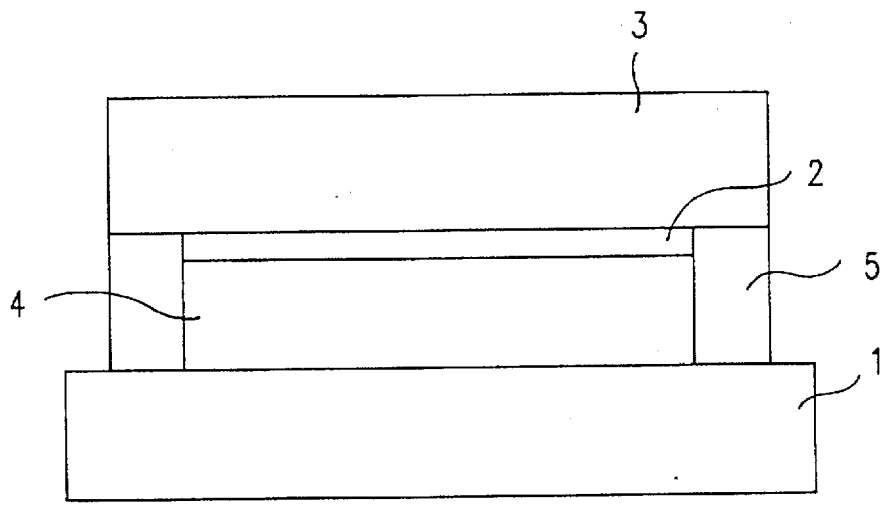
FIG. 5 is a cross-sectional view of an exemplary conventional liquid crystal display apparatus.

FIG. 4 shows a structure of a TFT display substrate 202 in Example 2 according to the present invention. The elements having the same function and effect as those of the conventional example shown in FIG. 7 carry identical reference numerals, and their descriptions are omitted. Hereinafter, the difference between the TFT display substrate 202 in Example 2 and the TFT display substrate 101-1 in Example 1 will be described.

Referring to FIG. 4, strip-shaped dummy pixel electrodes 41 are provided as locating pixel electrodes in the column direction on the right and left sides of display pixel electrodes 42 arranged in a matrix. The dummy pixel electrodes 41 are connected to short-circuit line 13b, but insulated from gate lines 16 by gate insulating films (not shown) formed on the gate lines 16. The dummy pixel electrodes 41 are formed independently (i.e., electrically isolated) from the source lines 15, and thus, they can be supplied with a voltage through the short-circuit line 13b independently from the source lines 15 connected to the display pixel electrodes 42. The dummy pixel electrodes 41 have the similar function to that of the dummy pixel electrodes 31 in Example 1. More specifically, in detecting defective pixels, the signal $V_a$ shown in FIG. 3A is input to the dummy pixel electrodes 41 through the short-circuit line 13b, whereby the pixel electrodes are located. The dummy pixel electrodes 41 preferably have the same width as that of the pixel electrodes and have a length close to that of one column of the pixel electrodes.

The dummy pixel electrodes 41 are used only for locating the pixel electrodes. Therefore, switching elements such as TFTs and source lines for the dummy pixel electrodes 41 are not required, which simplifies the production steps and decreases the possibility of the occurrence of defects.

The advantage of arranging the dummy pixel electrodes 41 in the form of a strip is as follows. Most electrostatic breakdown is an S-G leakage, i.e., a short between a source and a gate caused by the breakdown of a gate insulating film and a semiconductor layer formed on a gate of the TFT 17. In order to avoid this problem, static charges coming into the TFT 17 through the gate should be dissipated. In the present example, the dummy pixel electrode 41 is formed on gate insulating films made of SiNx on gate lines 16 made of Ta or Al to obtain an capacitor structure (Metal/Insulator/ITO). This structure functions as a capacitor to dissipate static charges into the dummy pixel electrodes 41. In this manner, the electrostatic breakdown of the TFT 17 can be prevented even if the short-circuit lines 11a, 13a and the like have been divided. It is also possible that the dummy pixel electrode is made of metal. In this case, an capacitor structure (Metal/Insulator/Metal) is obtained.

A method for producing a liquid crystal display apparatus having the TFT display substrate 202 in the present example will be described below.

In the TFT production step of forming the TFTs 17 and the pixel electrodes 42, the TFT display substrates are simultaneously formed on the glass substrate 34 as shown in FIG. 1 by a conventional method. The dummy pixel electrodes 41 can be formed by the same process as that of forming the pixel electrodes 42 or the source lines. Examples of the material used for the dummy pixel electrodes 41 include conductors such as ITO, aluminum, and tantalum.

Thereafter, the glass substrate 34 is attached to a counter substrate, and liquid crystal is injected therebetween. The glass substrate 34 is cut into four portions along a dash-dot line 19 in FIG. 1. The short-circuit lines 11a, 11b, 13a, 13b and 13c are cut away by trimming the edges of the glass substrate 34, whereby a plurality of gate lines 16 are insulated from each other. Although the short-circuit lines 11a, 11b, 13a, 13b and 13c are shown in large line-width for convenient observation, they actually have a line-width of about 400 µm to 1000 µm. After the short-circuit lines 11a, 11b, 13a, 13b and 13c are cut away, static charges can be prevented from coming into the TFTs by using the strip-shaped dummy pixel electrodes 41. Furthermore, a mounting step of attaching external drive components such as a TAB is conducted. In this way, an active matrix liquid crystal display apparatus is completed.

In the present example, the addition of a simple pattern allows defective pixels to be detected with respect to a substrate having external single input terminals in which a display signal is input to the display pixel electrodes through each input terminal of the source lines in one direction. Furthermore, the addition of the simple pattern brings various effects such as the shortening of an inspection time and the dissipation of static charges.

In the above-mentioned examples, the dummy patterns are provided on the right and left sides of a TFT display substrate in one column, whereby the pixel electrodes are located. However, the present invention is not limited thereto. The pixel electrodes can also be located by providing the dummy patterns on one side of the TFT display substrate in one column (or as one strip-shaped electrode) or in two or more columns (or as two or more strip-shaped electrodes). In the examples, TFTs are used as switching elements. However, other elements such as MIM elements can be used. Furthermore, in the examples, the dummy pixel electrodes are arranged at the same pitch as that of the display pixel electrodes. However, the present invention is not limited thereto. When the dummy pixel electrodes are arranged at the same pitch as that of the display pixel electrodes, the inspection time can be shortened.

In the above examples, the locating pixel electrodes are connected to the short-circuit line 13b. However, the display pixel electrodes connected to the short-circuit line other than the short-circuit line 13b can also be used as the locating pixel electrodes.

The active matrix large glass substrate used for liquid crystal display apparatus are described. However, the active matrix large glass substrate of the present invention is not limited thereto and cab also be used as active matrix substrates of display apparatus using materials with electrooptical characteristics.

According to the present invention, the following effects can be obtained.

The detection of breaks and defective pixels can be efficiently and accurately conducted in a panel having external single input terminals, which had not been realized before, merely by modifying the electrode pattern and algorithm. The addition and modification of the algorithm also shortens the inspection time, which is advantageous in terms of an economical aspect. In addition, this enables a panel having a minute pixel pitch to be easily inspected.

Furthermore, the display pixel electrodes and the locating pixel electrodes are connected to different short-circuit lines so that separate signals can be input to the display pixel electrodes and the locating pixel electrodes. This enables the pixels to be accurately located. Still furthermore, since a driver is provided only on one side of the display portion, cost can be decreased.

As described above, panels having external single input terminals currently in popular use can be inspected by merely adding and modifying simple patterns without greatly changing the currently used inspectors.

When applied to panels with a high opening ratio with a Pixel On Pas structure (i.e., pixel electrodes are provided on TFTs, source and gate lines via interlevel insulators), the present invention becomes more effective.

Moreover, the currently used imaging devices can be used almost as they are, instead of introducing expensive imaging devices with good resolution so that the production facility can be effectively utilized.

Furthermore, strip-shaped dummy pixel electrodes prevent static charges from coming into the TFTs after dividing the short-circuit lines.

Furthermore, the locating pixel electrodes and the display pixel electrodes are led out separately in the upper and lower directions of the TFT display substrate, whereby the short-circuit lines are not required to be multi-layered and leakage defects can be prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising an active matrix substrate and a counter substrate opposing the active matrix substrate via a liquid crystal layer, the active matrix substrate including: a display portion having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a first electrode provided along the source lines outside of the display portion, wherein the first electrode serves to produce a reference signal by changing a surface potential distribution of the substrate, and the positions of the plurality of pixel electrodes are determined based on the reference signal.

2. A liquid crystal display apparatus according to claim 1, wherein the first electrode is a dummy electrode which is not used for display.

3. A liquid crystal display apparatus according to claim 1, wherein the first electrode is composed of a plurality of electrodes having the same structure as a structure of the pixel electrodes.

4. A liquid crystal display apparatus according to claim 1, wherein external single input terminals of the source lines are provided only on one side of the display portion.

5. A liquid crystal display apparatus according to claim 1, wherein external single input terminals of the source lines and external single input terminals of the first electrode are provided on different sides of the display portion.

6. A liquid crystal display apparatus according to claim 1, wherein at least two of the first electrodes are provided along the source lines on both sides of the display portion.

7. A liquid crystal display apparatus according to claim 1, wherein the first electrode has a strip-shape.

8. A method for producing a liquid crystal display apparatus including: an active matrix substrate having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a counter substrate opposing the active matrix substrate via a liquid crystal layer, the method comprising the steps of:

forming a first electrode along the source lines outside the display portion;

applying a voltage to an element connected to the first electrode produces a first surface potential distribution of the substrate;

detecting the first surface potential distribution, thereby determining the position of the first electrode; and determining positions of the plurality of pixel electrodes based on the position of the first electrode.

9. A method for producing a liquid crystal display apparatus according to claim 8, further comprising the steps of:

applying a voltage to the plurality of pixel electrodes through the plurality of source lines to produce a second surface potential distribution of the substrate after the step of determining positions of the plurality of pixel electrodes;

detecting the second surface potential distribution of the substrate;

sampling a sum potential distribution of the first surface potential distribution and the second surface potential distribution; and determining the position of a defective pixel based on a sample from the sampling of the sum potential distribution.

10. A method for producing a liquid crystal display apparatus according to claim 8, wherein the first electrode is a dummy electrode which is not used for display.

11. A method for producing a liquid crystal display apparatus according to claim 8, wherein the first electrode is formed in the same step as a step of forming the pixel electrodes so as to have the same structure as a structure of the pixel electrodes.

12. A method for producing a liquid crystal display apparatus according to claim 8, wherein the first electrode is formed so as to have a strip-shape.

13. A method for producing a liquid crystal display apparatus according to claim 12, wherein the strip-shaped first electrode functions so as to protect the switching elements from static charges generated in the course of production.

14. A method for producing a liquid crystal display apparatus according to claim 8, wherein external single input terminals of the source lines are provided only on one side of the display portion.

15. A method for producing a liquid crystal display apparatus according to claim 8, wherein external single input terminals of the source lines and external single input terminals of the first electrode are provided on different sides of the display portion.

16. A method for producing a liquid crystal display apparatus according to claim 8, wherein at least two of the first electrodes are provided along the source lines on both sides of the display portion.

17. An active matrix substrate comprising:

a display portion having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a first electrode provided along the source lines outside of the display portion, wherein the first electrode serves to produce a reference signal by changing a surface potential distribution of the substrate, and the positions of the plurality of pixel electrodes are determined based on the reference signal.

18. An active matrix substrate according to claim 17, wherein the first electrode is in the form of a strip.

19. A method for inspecting an active matrix substrate including: a display portion having a plurality of source lines, a plurality of gate lines crossing the plurality of source lines, a plurality of pixel electrodes arranged in a matrix in regions surrounded by the plurality of source lines and the plurality of gate lines, and switching elements for connecting the pixel electrodes to the source lines and the gate lines; and a first electrode provided along the source lines outside of the display portion, the method comprising the steps of:

applying a voltage to an element connected to the first electrode produces a first surface potential distribution of the substrate;

detecting the first surface potential distribution, thereby determining the position of the first electrode; and determining positions of the plurality of pixel electrodes based on the position of the first electrode.

20. A method for inspecting an active matrix substrate according to claim 19, further comprising the steps of:

applying a voltage to the plurality of pixel electrodes through the plurality of source lines to produce a second surface potential distribution of the substrate after the step of determining positions of the plurality of pixel electrodes;

detecting the second surface potential distribution of the substrate;

sampling a sum potential distribution of the first surface potential distribution and the second surface potential distribution; and determining the position of a defective pixel based on a sample from the sampling of the sum potential distribution.

* * * * *